Figure 1:
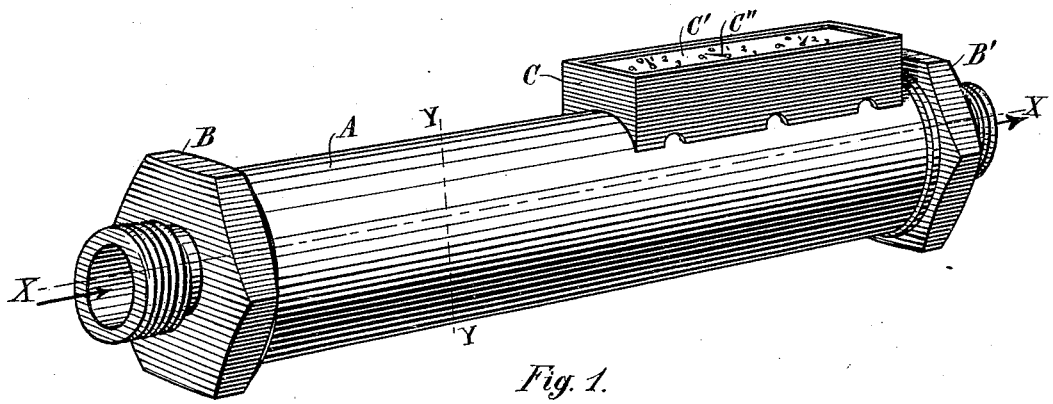

(No Model.)  3 Sheets—Sheet 1.

L. G. WELKER.
LIQUID OR GAS METER.

No. 398,013.  Patented Feb. 19, 1889.

Witnesses.
J. W. Gibbs.
C. J. Webster.

Inventor:
Louis G. Welker
By William Webster
Attorney.

(No Model.) 3 Sheets—Sheet 2.

L. G. WELKER.
LIQUID OR GAS METER.

No. 398,013. Patented Feb. 19, 1889.

Witnesses.
J. W. Gibbs.
C. J. Webster.

Inventor:
Louis G. Welker
By William Webster
Attorney.

(No Model.) 3 Sheets—Sheet 3.

L. G. WELKER.
LIQUID OR GAS METER.

No. 398,013. Patented Feb. 19, 1889.

Witnesses.
J. W. Gibbs.
C. J. Webster.

Inventor:
Louis G. Welker
By William Webster
Attorney.

UNITED STATES PATENT OFFICE.

LOUIS G. WELKER, OF TOLEDO, OHIO.

LIQUID OR GAS METER.

SPECIFICATION forming part of Letters Patent No. 398,013, dated February 19, 1889.

Application filed May 3, 1888. Serial No. 272,663. (No model.)

*To all whom it may concern:*

Be it known that I, LOUIS G. WELKER, a citizen of the United States, residing at Toledo, in the county of Lucas and State of Ohio, have invented certain new and useful Improvements in Liquid or Gas Meters; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to a liquid or gas meter of the character used to measure the liquid or aeriform fluid in its passage from the ingress to the egress ports of a receptacle through which the same is caused to pass.

The object of the invention is to provide a meter that shall be inexpensive in construction, accurate in its operation, and durable.

The invention consists in a shell or conduit through which the fluid is caused to pass and be measured by the undulatory movement of a freely-moving spring, as the spring in its wave motion forms receptacles for the fluid of a size determined by the relative lengths of the shell and spring, whereby the fluid is allowed to pass freely through the meter and the register caused to correctly indicate the quantity of fluid discharged at the exit irrespective of any fluctuation there may be in the pressure of the fluid.

In the ordinary diaphragm-meter the diaphragm is secured at its periphery between the shells of the case, and the amount of fluid passing therethrough is indicated either directly or indirectly by the distention or pulsation of the diaphragm. This not only soon fractures the diaphragm by the necessary expansion and contraction to which it is subjected, but renders it impossible to correctly register the quantity of fluid when the pressure varies from a maximum to a minimum amount. These difficulties are entirely overcome in the construction herein described, in which there is employed the simple arrangement of a straight conduit through which the fluid passes and a simple form of leaf-spring having a free and uninterrupted lateral motion therein, whereby all expansion and contraction of spring is avoided and the device rendered capable of withstanding the greatest amount of use without wear or fracture.

Figure 4:
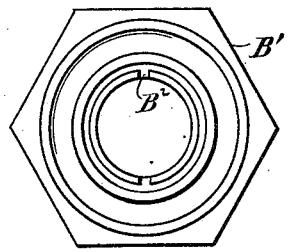
Figure 2:
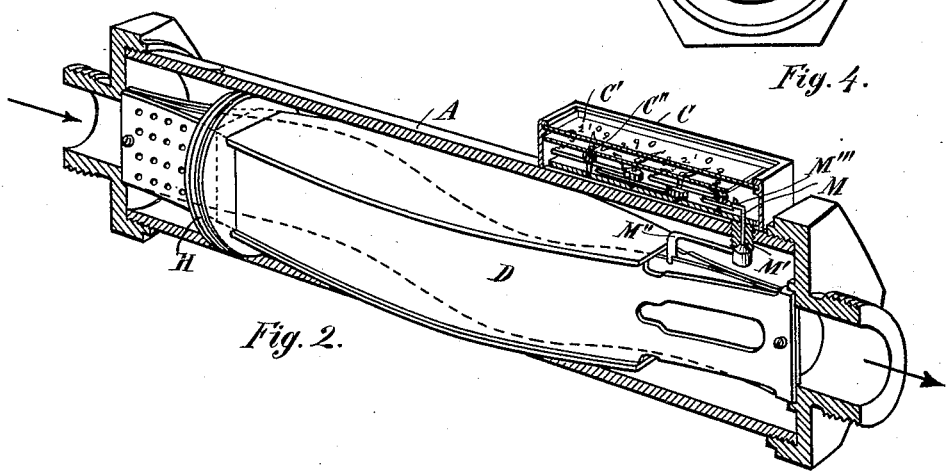
Figure 3:
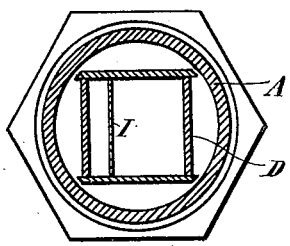
Figure 5:
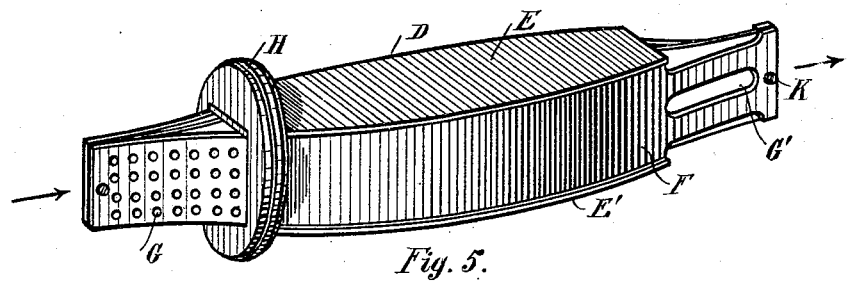
Figure 6:
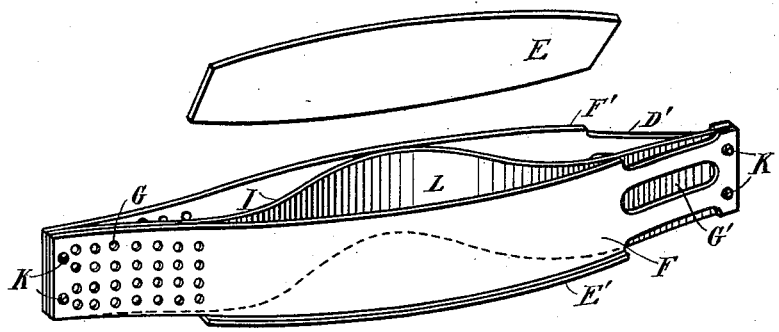
Figure 7:
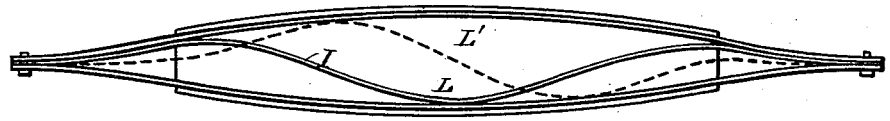
Figure 8:
Figure 9:
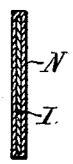
Figure 10:
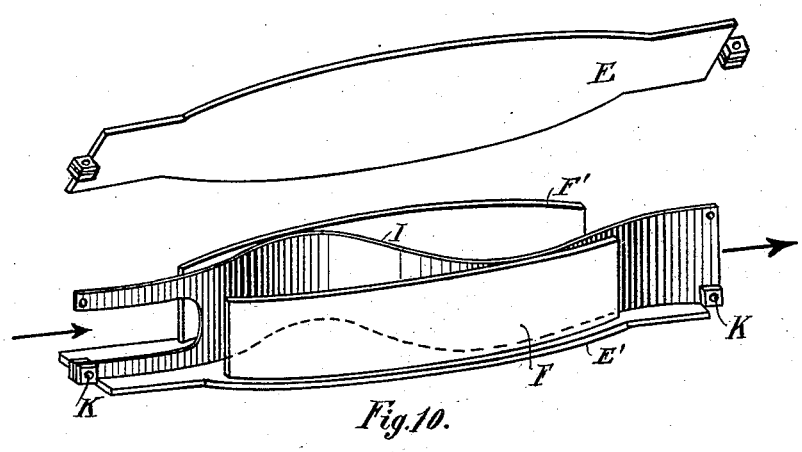
Figure 11:
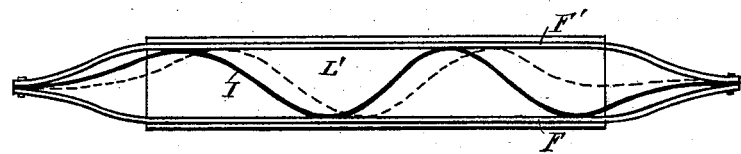

In the drawings, Figure 1 is a perspective view of a complete device. Fig. 2 is a vertical longitudinal view on lines $x\ x$, Fig. 1, the front half of the casing being removed to show the interior thereof. Fig. 3 is a transverse section on lines $y\ y$, Fig. 1. Fig. 4 is a plan view of the exit-end attachment. Fig. 5 is a perspective view of the inner shell which incloses the spring. Fig. 6 is a perspective view of the inner shell with the top removed to disclose the spring. Fig. 7 is a plan view of the shell with the top side removed. Fig. 8 is a like view showing the spring with more than one undulation. Fig. 9 is a transverse section of the spring inclosed with an impervious covering. Fig. 10 is a perspective view of a modified form of shell, the top being removed to disclose the spring and the mode of attaching the same. Fig. 11 is a plan view of Fig. 10 with two undulations in the spring.

A designates the casing, which may be cylindrical, rectangular, or any preferred shape in cross-section, and is inclosed at each end by screw-caps B and B', cap B being at the ingress and cap B' at the egress end of the meter.

C designates a receptacle for the indicator mechanism, which consists, preferably, of a rectangular box either attached to or formed integral with the casing, and covered with a transparent plate, C', to permit observation to the indicators C'', which may be of the usual or any preferred mechanism.

D is the inner shell, rectangular in cross-section and decreasing in area from the center to each end upon the upper and lower sides, E and E', in concavo-convex form, the front and rear sides, F and F', being of the same width throughout their entire lengths, with the exception of cut-away portions D' near the egress-ports of the shell.

The front and rear sides, F and F', of the shell have perforations G at the front or ingress end of the shell, the opposite ends of these sides having an elongated perforation, G', for the egress of the fluid. The upper and lower sides, E and E', are shorter than the front and rear sides, as shown, and are either formed integral therewith or joined in any preferred manner.

H designates a filling-piece inclosing the end of the shell and fitting tightly within the outer casing at or near the ingress end of the same.

I designates a spring, formed of metal or any impervious flexible material, which is secured between the front and rear sides of the shell at each end thereof by means of fastenings K, which may be screws, rivets, bolts, or projections capable of being riveted securely. Spring I is of greater length than side pieces, F and F', and is contracted in length within the shell to form one or more undulations or waves, L, thereby forming as many compartments L' as there are undulations in the spring by reason of the spring impinging against the sides of the shell at various points throughout the interior thereof.

The shell is arranged as described with the spring secured therein, and is then inserted within the casing. Cap B' is secured in place upon the egress end of the casing. The shell is then inserted, the end at the egress-port fitting within grooves B'' in cap B' to hold the shell in position. Cap B is secured in place and the meter is connected with the proper fluid-pipes.

M designates a right-angled lever passed through a perforation, M', in the casing, the inner end of the lever, M'', being bifurcated to embrace the spring, the outer end, M''', being bent at right angles to connect with a pawl mechanism for actuating the indicator mechanism, adapted to indicate by suitable dials and pointers the amount of fluid passing through the meter. As no claim is laid to this especial feature of mechanism, a further description is deemed unnecessary.

In operation the fluid, being admitted through the perforation in cap B, finds a passage through perforations G of the shell and strikes the spring, which forms receptacles for a determinate quantity, (regulated by the relative length of the spring and shell,) and as each measure of fluid passes through the shell the undulations move from one side to the other of the same, as indicated in dotted lines in Figs. 7 and 8, and the portion of spring near the egress-port in its movement from side to side actuates the inner end, M'', of lever M, causing it to oscillate with the movement of the spring, thereby actuating the outer end, M''', and by any preferred connection therewith to the indicator registers the amount of fluid passing through the shell.

In the modified construction shown in Fig. 11 the shell is made rectangular and of an equal size throughout its length, and in lieu of the perforations in the side portions the spring is cut away at the ingress end of the same, and the fluid is led directly to the spring, flowing to either side that may afford an opening therefor, the end of spring at the egress-port being of full size in view of the straight outlet for the fluid. In this construction the fastenings K are upon the inner sides of the upper and lower sides of the shell.

The operation in the modified construction is the same as has been already described.

It will be seen that the movement of the spring is positive, causing an even measurement irrespective of the varying pressure of the fluid, and also that the movement of the spring is without expansion or contraction; hence the usual wear and tendency to fracture are entirely obviated.

The spring may be formed of metal or any elastic substance, and may be covered with any impervious coating, N, as illustrated in Fig. 9, if desired.

What I claim, and desire to secure by Letters Patent, is—

1. In a fluid-meter, a casing, a shell inclosed within the same, and a spring immovably secured to the shell at each end, secured in the path of the passing fluid, adapted to measure the same in compartments formed by the undulatory movement of the spring, as and for the purpose set forth.

2. In a fluid-meter, a shell having a spring of greater length immovably secured at each end thereof, in combination with a casing inclosing the shell, as and for the purpose set forth.

3. In a fluid-meter, a spring connected with a fluid-receptacle, undulations formed therein by the rigid attachment of each end of the spring, and a lever connected with the spring and indicator mechanism, as and for the purpose set forth.

4. In a fluid-meter, an outer casing having egress and ingress ports for liquid, a shell within the casing provided with openings for admission of fluid, and a spring immovably attached at each end to the shell and impinging upon opposite sides of the shell, in combination with an indicator mechanism connected with the spring, as and for the purpose set forth.

In testimony that I claim the foregoing as my own I hereby affix my signature in presence of two witnesses.

LOUIS G. WELKER.

Witnesses:
CARROLL J. WEBSTER,
WILLIAM WEBSTER.